US006536374B1

(12) United States Patent
Suerth et al.

(10) Patent No.: US 6,536,374 B1
(45) Date of Patent: Mar. 25, 2003

(54) SIAMESE FIGHTING FISH AQUARIUM

(76) Inventors: Frank Suerth, 5228 W. Giddings, Chicago, IL (US) 60630; Jerry Levin, 3155 Cherry La., Northbrook, IL (US) 60062

( * ) Notice: Subject to any disclaimer, the term of this patent is extended or adjusted under 35 U.S.C. 154(b) by 0 days.

(21) Appl. No.: 10/158,716

(22) Filed: May 30, 2002

(51) Int. Cl.[7] .............................................. A01K 63/00
(52) U.S. Cl. ...................................... 119/248; 119/258
(58) Field of Search ................................ 119/248, 245, 119/252, 258

(56) References Cited

U.S. PATENT DOCUMENTS

| 1,838,215 A | 12/1931 | De Clairmont |
| 3,288,110 A | 11/1966 | Goldman et al. |
| 3,512,503 A | 5/1970 | Willinger |
| 3,618,238 A | 11/1971 | Willinger |
| 3,706,299 A | * 12/1972 | Hendges ..................... 119/258 |
| 4,120,265 A | 10/1978 | Davis |
| 5,090,357 A | 2/1992 | Pucci |
| 5,144,909 A | 9/1992 | Tominaga |
| 6,443,099 B1 | * 9/2002 | Boggs ........................ 119/248 |

* cited by examiner

Primary Examiner—Charles T. Jordan
Assistant Examiner—Judith Nelson
(74) Attorney, Agent, or Firm—Leydig, Voit & Mayer, Ltd.

(57) ABSTRACT

A aquarium for containing Siamese fighting fish which includes a rectangular housing having a plurality of long, narrow width compartments oriented parallel to a front viewing wall for maintaining fish contained in the compartments in a swim direction parallel to the front viewing wall for enhanced viewing and for interaction with fish passing in adjacent compartments.

8 Claims, 2 Drawing Sheets

SIAMESE FIGHTING FISH AQUARIUM

FIELD OF THE INVENTION

The present invention relates generally to aquariums, and more particularly to a compartmented fish aquariums particularly adapted for containing and aesthetically displaying Siamese fighting fish.

BACKGROUND OF THE INVENTION

Siamese fighting fish, and particularly male Betta fish, are beautifully colored fish with long flowing fins. These fish cannot be housed in the same aquarium due to the their aggressive nature. While compartmented aquariums have been proposed for male Betta fish, these prior aquariums suffer from various drawbacks. Prior aquariums, such as shown in U.S. Pat. Nos. 3,512,503 and 5,144,909, typically contain each fish in a cell-like compartment disposed in side-by-side relation along the length of the aquarium. Such compartments greatly restrict movement of the individual fish and preclude the display of the fish in their most beautiful form.

OBJECTS AND SUMMARY OF THE INVENTION

It is an object of the present invention to provide a compartmented aquarium which is adapted to more aesthetically and naturally display male Betta fish.

Another object is to provide an aquarium as characterized above in which provides the illusion of freely containing numerous male Betta fish in a common tank.

A further object is to provide an aquarium of the foregoing type in which the aquarium that is effective for displaying male Betta fish from their most attractive vantage point.

Still another object is to provide an aquarium of the above kind which tends to maintain a plurality of male Betta fish in an orientation transverse to the viewing direction, while at the same time providing the illusion that the fish are housed within the same aquarium as the neighboring fish.

Yet another object is to provide such an aquarium in which the male Betta fish are encouraged to interact, without harm to each other, so to flare their gills in a full flowing manner for enjoyable viewing.

These and other objects, features, and advantages of the invention will become more readily apparent upon reading the following detailed description of the preferred embodiment, and upon reference to the accompanying drawings wherein:

Figure 1:
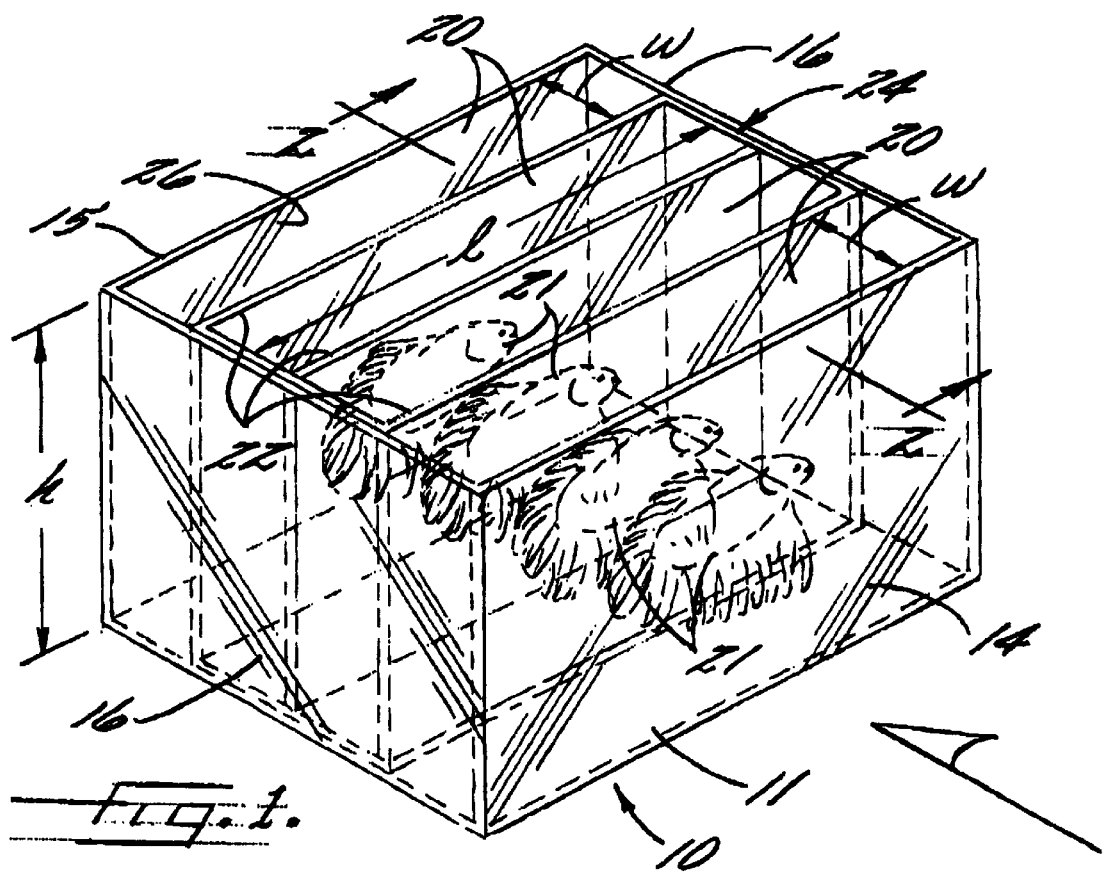
FIG. 1 is a perspective of a compartmented aquarium in accordance with the invention with an individual male Betta fish in each compartment.

While the invention is susceptible to various modifications and alternative constructions, a certain illustrated embodiment thereof has been shown in the drawings and will be described in detail below. It should be understood, however, that there is no intention to limit the present invention to the form disclosed. On the contrary, the intention is to cover all modifications, alternative constructions, and equivalents that fall within the spirit and scope of the invention.

DETAILED DESCRIPTION OF THE INVENTION

Figure 2:
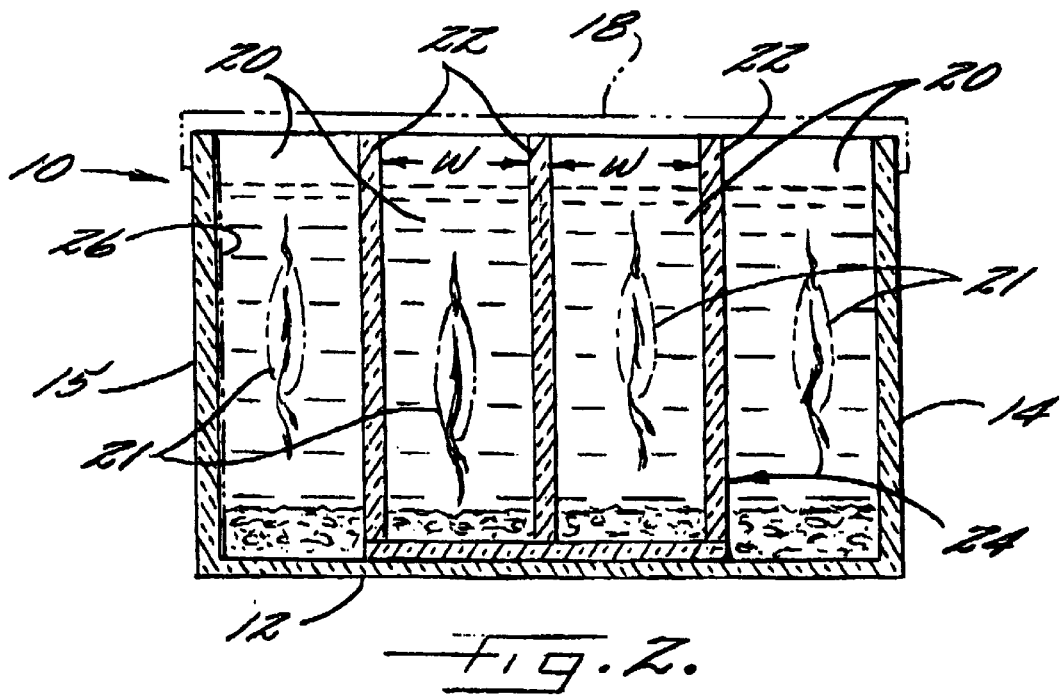
FIG. 2 is a transverse vertical section of the illustrated aquarium, taken in the plane of line 2—2 in FIG. 1.

Referring now more particularly to FIGS. 1 and 2 of the drawings, there is shown an illustrative aquarium 10 embodying the present invention particularly adapted for containing Siamese fighting fish, and particularly male Betta fish. The aquarium 10 comprises a generally elongated, rectangular shaped housing 11 made of glass or transparent plastic material. The housing comprises a base 12, a front viewing wall 14, a rear wall 15, and sidewalls 16 at opposite ends of the front and rear walls 14, 15. The housing 11 may have a removable cover 18.

Figure 3:
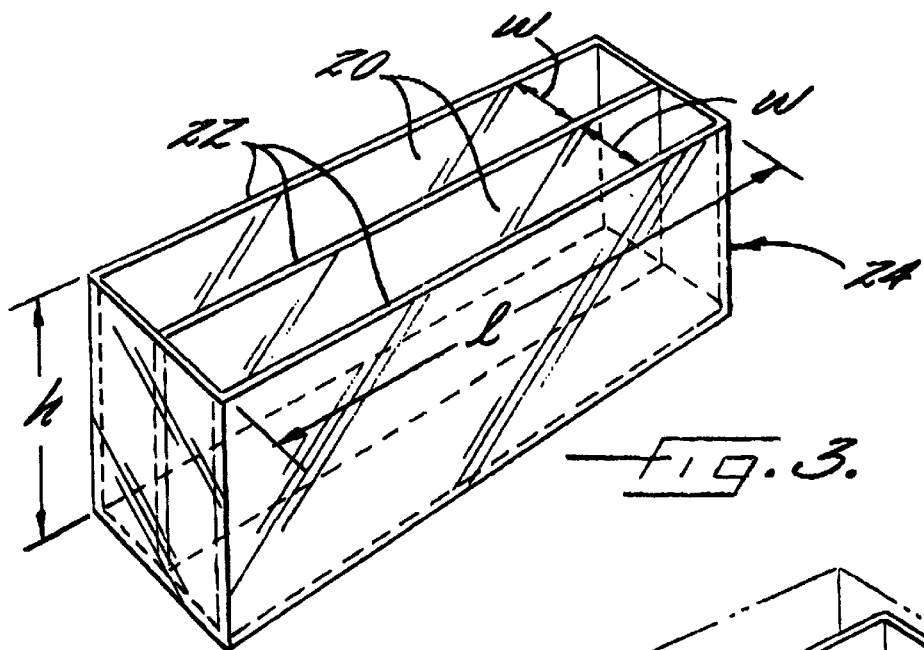
FIG. 3 is a perspective of a removable of the component of the illustrated aquarium.
Figure 4:
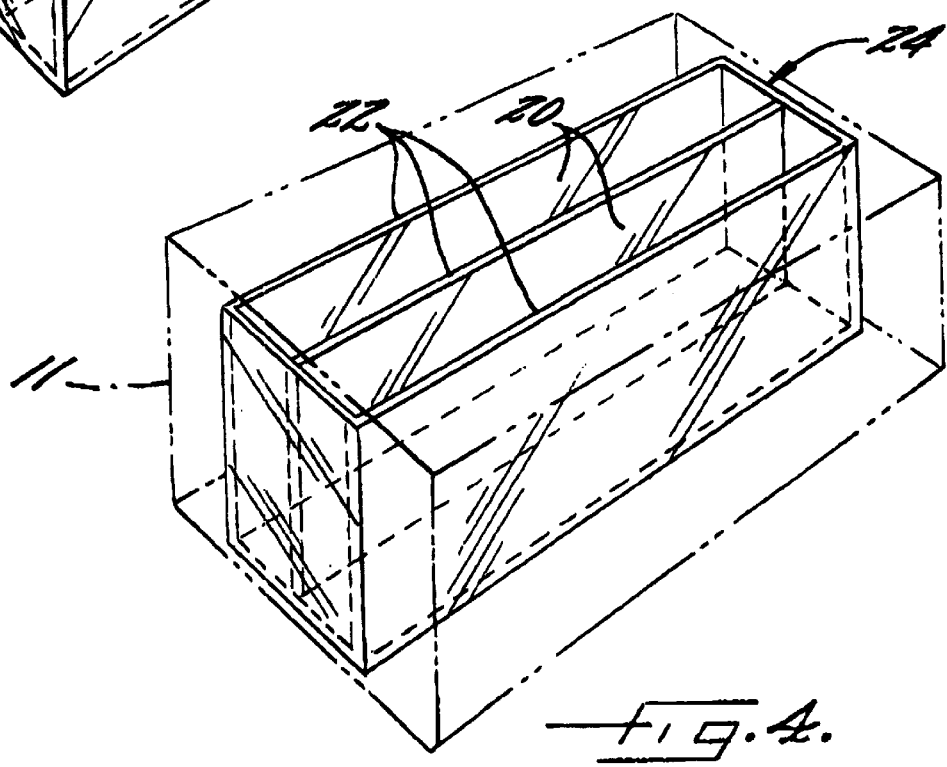
FIG. 4 is a partially diagrammatic depiction of the component shown in FIG. 3, in relation to the outer walls of the aquarium shown in phantom.

For defining a plurality of separate compartments 20, each for containing a respective individual male Betta fish 21, a plurality of internal separator walls 22 are provided at equally spaced locations between the front viewing wall 14 and the rear wall 15. The internal separator walls 20 in this case are defined by an insert component 24, depicted in FIG. 3, that is positionable into the rectangular housing 11. It will be understood by one skilled in the art that alternatively individual removable separator panels or walls could be provided within the housing for defining the plurality of individual fish containing compartments 20. While each separator or internal wall 22 defines part of a closed fish containing compartment which isolates and contains an individual fish 21 within the compartment and precludes fish from adjacent compartments 20 from entering, the internal separator walls 22 need not be water-tight with respect to each other. Hence, water circulation, if desired, may be maintained through the multiplicity of compartments 20.

In accordance with the invention, the fish containing compartments each have a relatively long narrow-width configuration oriented parallel to the front viewing wall for containing and maintaining the individual contained fish oriented in a swimming direction for most attractive and enjoyable viewing. The compartments 20 in this case each have a length "l" corresponding substantially to the length of the front viewing wall 14, a height "h" corresponding substantially to the height of the front viewing wall 14, and a relatively narrow width "w" in a direction perpendicular to the front wall 14.

In carrying out the invention, the narrow width "w" of each compartment 20 is sized to maintain the individual fish 21 in each compartment oriented in a swimming direction parallel to the front viewing wall 14 while only enabling the fish room for movement perpendicular to the front viewing wall sufficient for reversing swim directions. Surprisingly, Siamese fighting fish require a relatively small distance to effect reversal in swim direction. While the width "w" may be between about $3/8$ inch and two inches, preferably the width "w" is between about $1/3$ to $1\frac{1}{2}$ the length of the fish to be contained within the compartments. Most preferably, the width "w" should be about one-half the length of the fish contained within the compartment 20. A typical aquarium found to be suitable for containing Siamese fighting fish having a length of between two and three inches had a length "l" of 12 inches, a height of eight inches, and individual compartment widths of $1\frac{3}{8}$ inches. Compartments sized in such manner have been found to enable and encourage male Betta fish to swim a significant distance in a direction parallel to the front viewing wall, while providing the fish only sufficient transverse space to reverse directions.

The aquarium 10 of the present invention has been found to provide unexpected viewing pleasures and advantages over prior compartmentalized aquariums. At the outset, due to the relatively narrow width "w" of the compartments, as indicated above, male Betta fish 21 contained in the individual compartments are persuaded to swim in a direction parallel to the front viewing wall 14, which best orients the fish for viewing. Moreover, because the front viewing wall 14 and the separating walls 22 are transparent, the fish 21, when viewed from the front viewing wall 14, have the illusion of being in the same aquarium with the neighboring fish. Even more unexpectedly, it has been found that because the fish 21 swim in parallel paths, and parallel to the front viewing wall 14, the fish see neighboring fish in the adjacent compartments as they pass each other, and by virtue of their fighting nature, upon such occurrence, tend to frequently flare their gills and extend their long flowing fins in a peacock manner. With the fish oriented parallel to the front viewing wall 14, the repeated flaring of the fins of all of the fish are readily observable.

To further augment the illusion of a multiplicity of flaring Betta fish in a common tank, the forwardly facing face of the rear wall 15 may be provided with a mirrored surface 26. It will be appreciated that the mirrored surface will create the illusion of the aquarium 10 being larger than its actual size and containing even greater numbers of flaring fish than in actuality.

From the foregoing, it can be seen that compartmented aquarium of the present invention is adapted for more beautifully and naturally displaying male Betta fish. The aquarium encourages the fish to orient themselves and swim in a direction for best viewing, causing the fish to interact with repeated flaring of their gills and fins in full flowing and beautiful manner. Hence, the aquarium provides the illusion that a plurality of male Betta fish are contained in a common tank, while orienting the fish to swim in directions for best viewing and for interaction, without harm to each other.

What is claimed is:

1. An aquarium for containing Siamese fighting fish comprising:

a housing having a base, a front viewing wall, a rear wall, internal separator walls, and side walls at opposite ends of said front viewing wall, rear wall, and internal separator walls; said base and walls defining a plurality of compartments each for containing a respective individual Siamese fighting fish and preventing the respective fish from entering an adjacent compartment, said compartments having a relatively long narrow configuration with the long length of the compartment oriented parallel to the front viewing wall for maintaining the fish contained in the compartment in a swim direction parallel to the front viewing wall while only enabling the fish room for movement perpendicular to the front viewing wall for reversing swim directions.

2. The aquarium of claim 1 in which said compartments each have a width of no greater than about 1½ times the length of the fish contained within the compartment.

3. The aquarium of claim 1 in which said compartments each have a width of between ¾ and 2 inches.

4. The aquarium of claim 3 in which said compartments each have a width of about ¾ inch.

5. The aquarium of claim 1 in which said compartments each have a length at least 9 times the width of the compartment.

6. The aquarium of claim 1 in which said rear wall has a mirrored forwardly directing face.

7. The aquarium of claim 1 in which the fish in each of said plurality of compartments is observed through the front viewing wall of the housing.

8. An aquarium comprising:

a housing having a base, a front viewing wall, a rear wall, internal separator walls, and side walls at opposite ends of said front viewing wall, rear wall, and internal separator walls, said base and walls defining a plurality of compartments, a single Siamese fighting fish contained within each compartment and restricted from movement into an adjacent compartment, said compartments having a relatively long narrow configuration with the long length of the compartment oriented parallel to the front viewing wall, said compartments each having a width of between ⅓ and 1½ times the length of the fish contained in the compartment for maintaining the contained fish in a swim direction parallel to the front viewing wall while only enabling the fish room for movement perpendicular to the front viewing wall sufficient to reverse swim directions.

* * * * *